US007616419B2

(12) United States Patent
Koyama et al.
(10) Patent No.: US 7,616,419 B2
(45) Date of Patent: Nov. 10, 2009

(54) SWITCHGEAR CONTROL APPARATUS

(75) Inventors: Haruhiko Koyama, Tokyo (JP); Tomohito Mori, Tokyo (JP); Kenji Kamei, Tokyo (JP); Sadayuki Kinoshita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 204 days.

(21) Appl. No.: 11/907,054

(22) Filed: Oct. 9, 2007

(65) Prior Publication Data

US 2008/0123234 A1 May 29, 2008

(30) Foreign Application Priority Data

Nov. 28, 2006 (JP) ............................ 2006-319549

(51) Int. Cl.
*H02H 3/12* (2006.01)

(52) U.S. Cl. ........................................................ 361/71

(58) Field of Classification Search .................... 361/71
See application file for complete search history.

(56) References Cited

U.S. PATENT DOCUMENTS 4,724,391 A * 2/1988 Blahous ...................... 324/424
5,563,459 A * 10/1996 Kurosawa et al. ........ 307/141.4
6,392,390 B1 * 5/2002 Ito et al. ..................... 323/209
6,493,203 B1 * 12/2002 Ito et al. ..................... 361/159
7,095,139 B2 * 8/2006 Tsutada et al. .............. 307/129
7,336,461 B2 * 2/2008 Dupraz et al. ................. 361/71

FOREIGN PATENT DOCUMENTS

JP 55-151724 A 11/1980
JP 55-151725 A 11/1980

* cited by examiner

*Primary Examiner*—Stephen W Jackson
*Assistant Examiner*—Ann T Hoang
(74) *Attorney, Agent, or Firm*—Buchanan Ingersoll & Rooney PC

(57) ABSTRACT

A switchgear control apparatus includes a zero point interval detecting circuit, an interruption time judgment circuit and a reclosing time decision circuit. The zero point interval detecting circuit detects time intervals between successive zero points of a main circuit current. The interruption time judgment circuit judges that interruption time of the main circuit current is time of a zero point immediately preceding a zero point at which a difference between the time interval between two successive zero points and half the period of a commercial AC voltage exceeds a specific value. Upon detecting the gradient of the main circuit current at the interruption time, the reclosing time decision circuit sets reclosing time at a point in phase where the AC voltage has a maximum negative value if the gradient is positive, and at a point in phase where the AC voltage has a maximum positive value if the gradient is negative.

5 Claims, 3 Drawing Sheets

SWITCHGEAR CONTROL APPARATUS

BACKGROUND OF THE INVENTION

1. Field of the Invention

The present invention relates to a switchgear control apparatus for controlling opening/closing operation of each circuit breaker of a switchgear which disconnects and reconnects a power transmission line and, more particularly, the invention is concerned with a technique for suppressing a surge voltage which occurs when a power line is reconnected under no-load conditions.

2. Description of the Background Art

Conventionally, a controlled switching technique is used for suppressing a surge voltage which occurs when a power transmission line once disconnected is reconnected under no-load conditions. This control technique involves detecting a voltage across opposite terminals of a switchgear and closing the switchgear at a point in time when the opposite switchgear terminals have a common polarity as described in Japanese Unexamined Patent Publication Nos. 1980-151724 and 1980-151725, for instance.

In the event of so-called high-speed reclosing of a power transmission line at zero load, an electric charge which has been accumulated therein before circuit interruption is scarcely discharged and remains almost entirely in the transmission line, thus producing a residual DC voltage. A special type of voltage sensor system made up of a capacitive voltage divider, for example, is required for exactly measuring this residual voltage as mentioned in the above-cited Publications. However, such a special type of voltage sensor system is not provided in a generally used power system so that the conventional control technique is not useful enough from a practical point of view.

SUMMARY OF THE INVENTION

The present invention is intended to provide a solution to the aforementioned problem of the prior art. More particularly, it is an object of the invention to provide a highly practical switchgear control apparatus having a capability to effectively suppress a surge voltage occurring when an unloaded power line once disconnected is reconnected without the need for a special type of voltage sensor system for measuring a residual DC voltage on the unloaded power line.

According to the invention, a switchgear control apparatus controls opening/closing operation of a circuit breaker of a switchgear for disconnecting and reconnecting a power transmission line under no-load conditions. The switchgear control apparatus includes a voltage sensor for detecting an AC voltage on a power source side of the circuit breaker, a current transformer for detecting a main circuit current flowing through the circuit breaker, a contact opening time sensor for detecting contact opening time of a main contact of the circuit breaker at interruption of the power transmission line, an interruption time sensor for detecting interruption time at which the main circuit current flowing through the circuit breaker has been interrupted based on an output of the current transformer and the contact opening time detected by the contact opening time sensor, and a reclosing time decider for determining reclosing time at which the main contact of the circuit-breaker should be reclosed for reconnecting the power transmission line based on an output of the voltage sensor, the output of the current transformer and the interruption time detected by the interruption time sensor.

The switchgear control apparatus of the invention is configured to detect the AC voltage on the power source side of the circuit breaker, the main circuit current flowing through the circuit breaker and the contact opening time of the main contact of the circuit breaker, and to determine the reclosing time at which the main contact of the circuit breaker should be reclosed based on the detected AC voltage, main circuit current and contact opening time. Therefore, the present invention provides a highly practical switchgear control apparatus which can suppress a surge voltage occurring when an unloaded power line once disconnected is reconnected without the need for a special type of voltage sensor system capable of detecting a DC voltage component.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
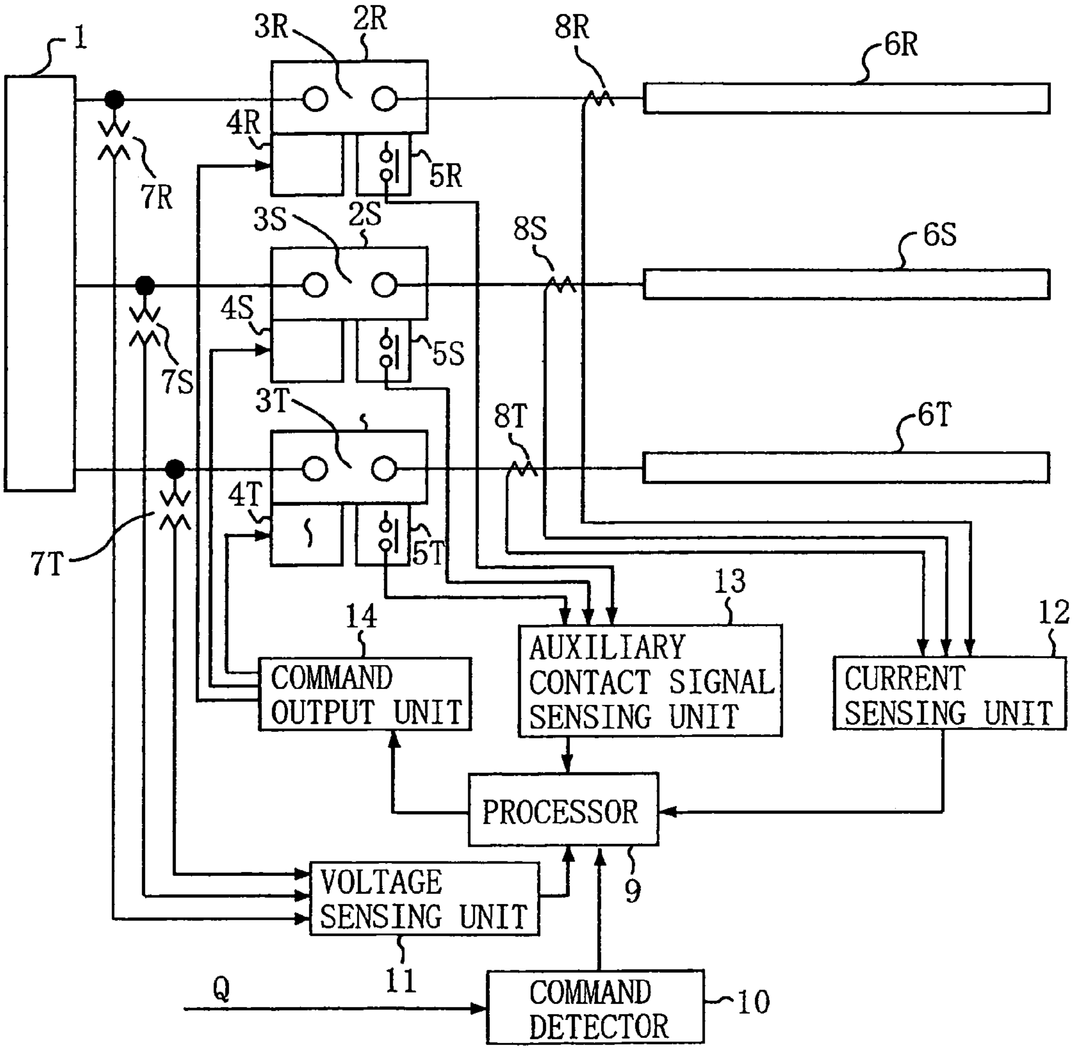
FIG. 1 is a diagram showing the configuration of a power system including a switchgear control apparatus according to a first embodiment of the invention.
Figure 2:
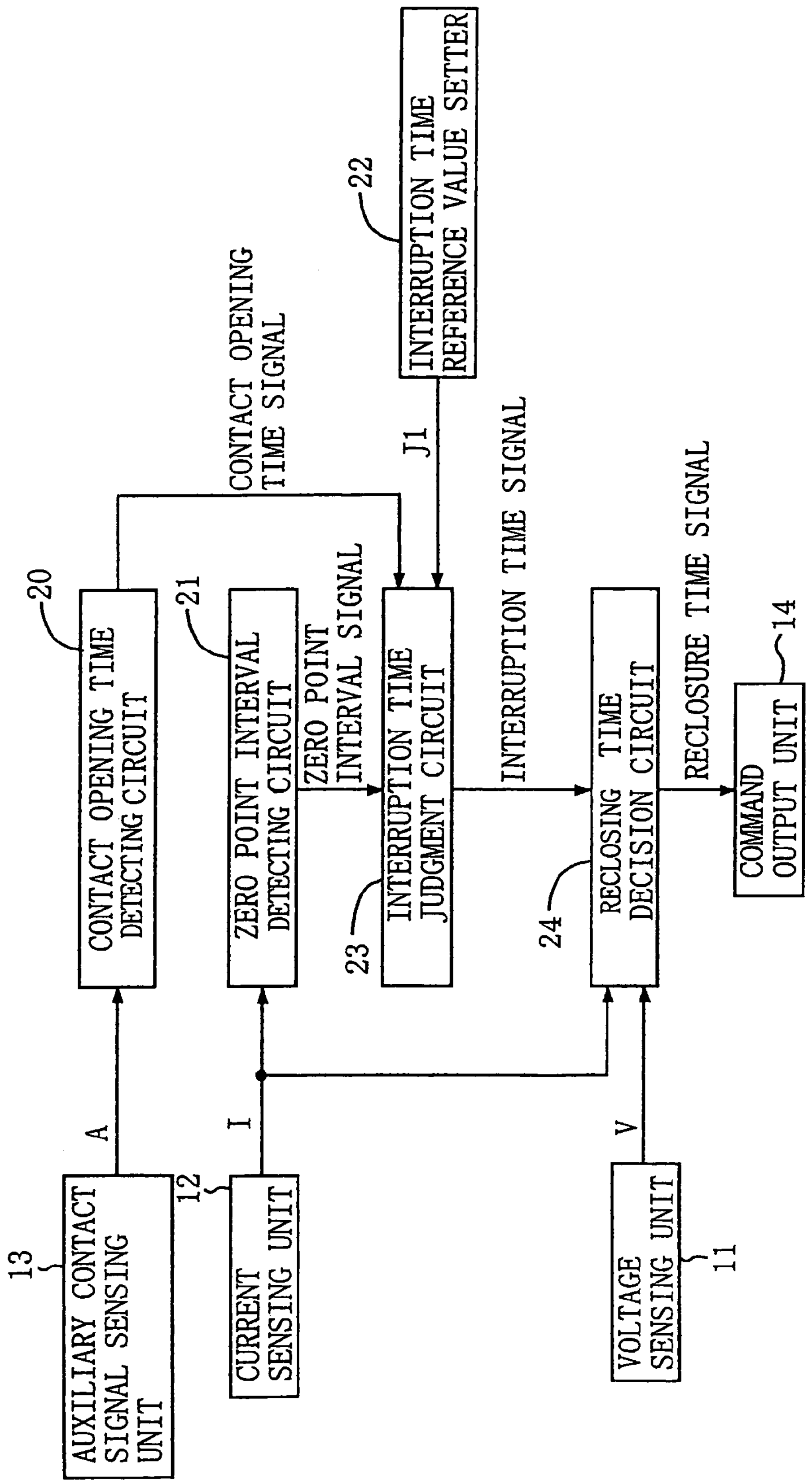
FIG. 2 is a block diagram showing the internal configuration of a processor of the switchgear control apparatus of FIG. 1.

FIG. 1 is a diagram showing the configuration of a power system including a switchgear control apparatus according to a first embodiment of the invention, and FIG. 2 is a block diagram showing the internal configuration of a processor 9 of the switchgear control apparatus constituting a principal part thereof.

Referring to FIG. 1, a three-phase power source 1 is connected to transmission lines 6R, 6S, 6T via respective circuit breakers 2R, 2S, 2T which may be opened and closed for disconnecting and reconnecting the transmission lines 6R, 6S, 6T under no-load conditions, respectively. The circuit breakers 2R, 2S, 2T of individual phases (indicated by R, S and T) are provided with main contact s 3R, 3S, 3T for interrupting and flowing main circuit currents through the circuit breakers 2R, 2S, 2T, auxiliary contacts 5R, 5S, 5T which make and break in a manner mechanically interlocked with the main contact s 3R, 3S, 3T, and operating mechanisms 4R, 4S, 4T for causing the main contact s 3R, 3S, 3T to make and break, respectively.

Voltage sensors 7R, 7S, 7T detect individual phase voltages of the three-phase power source 1 and deliver the detected voltages to the processor 9 through a voltage sensing unit 11. On the other hand, current transformers 8R, 8S, 8T detect currents flowing through the transmission lines 6R, 6S, 6T of the respective phases and deliver the detected currents to the processor 9 through a current sensing unit 12. Auxiliary contact signals produced as a result of make-break operation of the auxiliary contacts 5R, 5S, 5T are also fed into the processor 9 through an auxiliary contact signal sensing unit 13.

Upon receiving a command Q concerning interruption and reclose of the circuit breakers 2R, 2S, 2T through a command detector 10, the processor 9 outputs an open command to the operating mechanisms 4R, 4S, 4T through a command output unit 14, determines reclosing time at which the main contact s 3R, 3S, 3T should be reclosed based on information from the current sensing unit 12 and the auxiliary contact signal sensing unit 13, and outputs a relevant reclose command to the operating mechanisms 4R, 4S, 4T through the command output unit 14.

The configuration of the processor 9 is described below with reference to FIG. 2. Operation related to circuit interruption and reclose is performed similarly on each of the R, S and T phases, so that the suffixes R, S and T are omitted in the following discussion unless specifically needed. A contact opening time detecting circuit 20 detects contact opening time of the main contact s 3 of the circuit breakers 2 based on an auxiliary contact signal A fed from the auxiliary contact signal sensing unit 13 and outputs a contact opening time signal to a below-described interruption time judgment circuit 23. A zero point interval detecting circuit 21 successively determines intervals from one zero point to the next of a detected current signal I fed from the current sensing unit 12 and outputs a zero point interval signal to the interruption time judgment circuit 23. Based on the contact opening time signal fed from the contact opening time detecting circuit 20, the zero point interval signal fed from the zero point interval detecting circuit 21 and an interruption time reference value J1 fed from an interruption time reference value setter 22, the interruption time judgment circuit 23 determines interruption time at which the main circuit currents flowing through the circuit breakers 2 have been interrupted and outputs an interruption time signal to a below-described reclosing time decision circuit 24.

Although each of the current transformers 8 should inherently produce on a secondary side an output waveform which exactly duplicates the waveform of the main circuit current flowing on a primary side, the secondary-side output waveform does not exactly reflect the primary-side waveform especially during a transient phase immediately after interruption of the main circuit current due to time constants of each current transformer 8 and other circuits connected thereto. More particularly, the detected current signal I representing the output of each current transformer 8 remains nonzero for a specific period of time even after interruption of the main circuit current. Therefore, in order to determine the interruption time of the main circuit currents exactly from the detected current signal I, it is necessary to perform a further mathematical operation which will be later discussed in detail.

The reclosing time decision circuit 24 determines the reclosing time at which the circuit breakers 2 should be reclosed, scarcely producing a surge voltage, based on a detected voltage signal V fed from each of the circuit breakers 2, the detected current signal I fed from the current sensing unit 12 and the interruption time signal fed from the interruption time judgment circuit 23. Then, based on the reclosing time thus determined, the reclosing time decision circuit 24 outputs a reclosing time signal to the command output unit 14.

The working of the switchgear control apparatus of the first embodiment is now described referring chiefly to the block diagram of FIG. 2 and FIGS. 3A-3E showing waveforms at different points of the switchgear control apparatus.

Figures 3A, 3B, 3C, 3D, 3E:
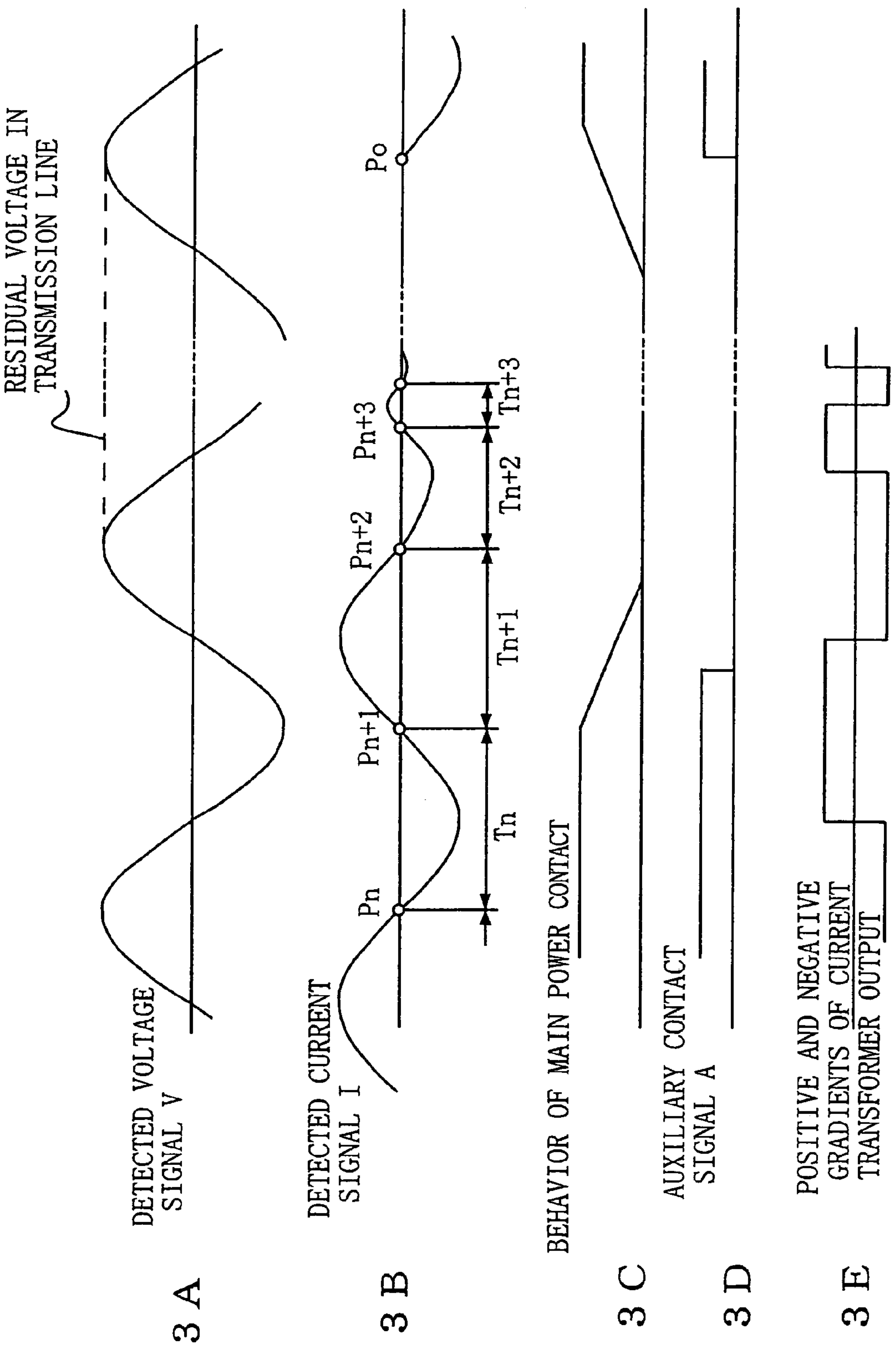
FIGS. 3A, 3B, 3C, 3D and 3E are diagrams showing waveforms for explaining the working of the switchgear control apparatus of the first embodiment of the invention.

FIG. 3A is a diagram showing the detected voltage signal V representing a voltage waveform of the three-phase power source 1 detected by each of the voltage sensors 7 through the voltage sensing unit 11. Needless to say, the three-phase power source 1 provides a constantly alternating AC voltage and each of the voltage sensors 7 need not be of a special type capable of detecting DC voltage components but may be of a commonly available standard type.

FIG. 3B is a diagram showing the aforementioned detected current signal I representing a current waveform detected by each of the current transformer 8 through the current sensing unit 12. Although this current waveform is supposed originally to represent the waveform of the main circuit current, it is likely that the detected current waveform does not exactly duplicate the waveform of the main circuit current during the transient phase immediately after interruption of the main circuit current due to electrical properties of each current transformer 8, for instance, as already mentioned.

FIG. 3C is a diagram schematically showing a behavior pattern of the main contact 3 of each circuit breaker 2, in which a High level represents a closed contact state and a Low level represents an open contact state. FIG. 3D is a diagram showing the aforementioned auxiliary contact signal A which turns from ON to OFF at a point in time (contact opening time) when each main contact 3 begins a mechanical motion to turn from the closed contact state to the open contact state. Contrary to this, the auxiliary contact signal A turns from OFF to ON at a point in time when each main contact 3 reaches the closed contact state upon completion of a mechanical motion to turn from the open contact state to the closed contact state. FIG. 3E is a diagram showing how the detected current signal I representing the output of each current transformer 8 alternates between states of positive and negative gradients.

Since the transmission lines 6 have a capacitive impedance, currents charged into the transmission lines 6 under no-load conditions are advanced in phase by as much as 90 degrees from the respective phase voltages as can be seen from FIGS. 3A and 3B. On the other hand, as the circuit breakers 2 for disconnecting and connecting the transmission lines 6 from the three-phase power source 1 interrupt the currents generally at a zero current point, the currents are interrupted in the proximity of an extreme voltage point and, thus, a DC-like voltage almost the same as a maximum phase voltage remains in each of the transmission lines 6.

A phenomenon which conventionally occurs when the transmission lines 6 carrying such a residual voltage are reconnected to the three-phase power source 1 is the occurrence of a reclosing surge voltage corresponding to the difference between the value of an instantaneous source voltage and the residual voltage on the transmission lines 6 at the moment that the circuit breakers 2 are reclosed. To suppress the reclosing surge voltage, it is necessary to reclose the circuit breakers 2 at a point in time when the source voltage becomes equal to the residual voltage on the transmission lines 6.

There is a fixed phase difference between the phase voltages and the corresponding charging currents as mentioned above. Therefore, a negative voltage is left in any transmission line 6 if the same transmission line 6 is disconnected at a zero current point at which a curve representing the current flowing through the transmission line 6 has a positive gradient, whereas a positive voltage is left in any transmission line 6 if the same transmission line 6 is disconnected at a zero current point at which the curve representing the current flowing through the transmission line 6 has a negative gradient (refer to FIGS. 3A and 3B). The residual voltage thus accumulated on each transmission line 6 normally attenuates with a given time constant which is generally 1 second or longer. The transmission line 6 once disconnected from the three-phase power source 1 is typically reconnected in about 0.3 second. Since only a small part of the residual voltage attenuates during this short period in time, it is to be understand that almost the same level of voltage as observed at interruption of the current flowing through the transmission line 6 remains when the same transmission line 6 is reconnected.

The present invention has been made in consideration of the aforementioned phenomenon related to circuit interruption and reclose under no-load conditions. The discussion below describes how each of the aforementioned elements of the processor 9 shown in FIG. 2 works.

First, the interruption time of each main circuit current is detected from the detected current signal I output from the current transformers 8. For this purpose, the zero point interval detecting circuit 21 detects successive zero points of the detected current signal I and successively determines intervals from one zero point to the next. Specifically, in the switchgear control apparatus of the first embodiment, the zero point interval detecting circuit 21 determines a time interval Tn from a zero point Pn to a zero point Pn+1, a time interval Tn+1 from the zero point Pn+1 to a zero point Pn+2, a time interval Tn+2 from the zero point Pn+2 to a zero point Pn+3, and so forth, and outputs the zero point interval signal to the interruption time judgment circuit 23.

The interruption time judgment circuit 23 calculates a difference between each successive time interval detected by the zero point interval detecting circuit 21 and half the period of a power frequency fed from the three-phase power source 1 and compares the difference thus calculated with the interruption time reference value J1 fed from the interruption time reference value setter 22. When the difference between the successively detected time interval and half the period of the power frequency exceeds the interruption time reference value J1, the interruption time judgment circuit 23 judges that the zero point immediately preceding the zero point at which the aforementioned difference has exceeded the interruption time reference value J1 was the interruption time of the main circuit current and outputs a corresponding interruption time signal to the reclosing time decision circuit 24.

The aforementioned approach to determining the interruption time from a change in zero point intervals is based on the fact that an alternating current waveform appears on the secondary side of each current transformer 8 due to transient characteristics thereof even after interruption of the main circuit current, or when no main circuit current flows on the primary side of each current transformer 8. The frequency, and thus the zero point interval, of the alternating current flowing on the secondary side of each current transformer 8 deviates from the power frequency. The approach of the present embodiment is intended to estimate the main circuit current interruption time by detecting a change in zero point intervals as discussed above.

When setting the interruption time reference value J1 to be used in judging whether a change in zero point intervals has occurred, it is necessary to take into consideration power frequency variations of approximately 5% as well as sensing errors of approximately 1% of individual current sensing devices, for example. Therefore, in the switchgear control apparatus of this embodiment, a criterion for judging whether a change in zero point intervals has occurred should preferably be set to a value approximately 10% of a rated power frequency.

The interruption time of the main circuit current naturally occurs at a point not earlier than the contact opening time at which each main contact 3 begins the mechanical motion to turn from the closed contact state to the open contact state. Accordingly, the interruption time judgment circuit 23 determines the interruption time on additional condition that the interruption time comes not earlier than the contact opening time fed from the contact opening time detecting circuit 20, thus reducing the likelihood of misjudgment.

The aforementioned approach of the present embodiment is described more specifically with reference to an example shown in FIGS. 3A-3E. At a point in time when a judgment is made on the time interval Tn+2 detected not earlier than the contact opening time at which the auxiliary contact signal A turns from ON to OFF, the aforementioned difference between the successively detected time interval and half the period of the power frequency exceeds the interruption time reference value J1, and the interruption time judgment circuit 23 judges that the zero point Pn+2 immediately preceding the zero point Pn+3 was the interruption time of the main circuit current in the example of FIGS. 3A-3E.

Upon receiving the interruption time signal fed from the interruption time judgment circuit 23, the reclosing time decision circuit 24 detects that the detected current signal I has a negative gradient at the interruption time Pn+2 (refer to FIG. 3E). As the residual voltage on each transmission line 6 has a maximum positive value upon interruption of the main circuit current, the reclosing time decision circuit 24 determines reclosing time at which each main contact 3 should be reclosed at an extreme positive voltage point based on the detected voltage signal V and outputs the reclosing time signal indicating the reclosing time thus determined to the command output unit 14. Then, upon receiving a reclose command from the command output unit 14, each of the operating mechanisms 4 activates the main contact 3 of the pertinent circuit breaker 2 to reclose at the extreme positive voltage point. As a result of the above-described control operation, each of the main contact s 3 is reclosed in a state in which voltages at opposite contact terminals are almost equal to each other, scarcely producing any surge voltage at contact reclose, and thus permitting highly reliable power system operation.

On the contrary, if the detected current signal I has a positive gradient at the interruption time determined by the interruption time judgment circuit 23, the residual voltage on each transmission line 6 has a maximum negative value upon interruption of the main circuit current. Thus, the reclosing time decision circuit 24 determines reclosing time at which each main contact 3 should be reclosed at an extreme negative voltage point based on the detected voltage signal V in this case.

While the contact opening time of each main contact 3 is detected from the signal fed from each auxiliary contact 5 as thus far discussed, the above-described arrangement of the first embodiment may be so modified as to determine the contact opening time from a contact operation signal which directly indicates behavior of each main contact 3.

Also, while the current transformers 8 are hooked on a transmission line side of the respective main contact s 3 in the foregoing first embodiment, this arrangement may be modified such that the current transformers 8 are hooked on a three-phase power source side of the respective main contact s 3 according to the present invention.

Since the switchgear control apparatus of the first embodiment of the present invention includes the contact opening time detecting circuit 20, the zero point interval detecting circuit 21, the interruption time judgment circuit 23 and the reclosing time decision circuit 24 as thus far discussed, the switchgear control apparatus can effectively suppress a surge voltage which may occur at reclose of an unloaded power line. It will be appreciated from the foregoing discussion that a highly practical switchgear control apparatus can be manufactured by using the present invention.

Second Embodiment

The interruption time judgment circuit 23 of the foregoing first embodiment determines the interruption time from the detected current signal I based on whether the difference between the successively detected time interval detected by the zero point interval detecting circuit 21 and half the period of the power frequency exceeds the specific interruption time reference value J1. This arrangement of the first embodiment is modified in a switchgear control apparatus according to a second embodiment of the invention as described hereinbelow. The following discussion focuses on how the switchgear control apparatus of the second embodiment detects a change in zero point intervals as the switchgear control apparatus works otherwise the same way as that of the first embodiment.

The interruption time judgment circuit 23 of the switchgear control apparatus of the second embodiment evaluates the amount of a change in zero point intervals successively detected by the zero point interval detecting circuit 21. For example, the interruption time judgment circuit 23 calculates in a successive sequence the ratio of a zero point interval detected in one calculation cycle to a zero point interval detected in an immediately preceding calculation cycle and determines the interruption time of each main circuit current has occurred when this ratio between two successive zero point intervals exceeds a specific set value.

Specifically, referring to FIG. 3B, the interruption time judgment circuit 23 successively calculates the values of (Tn+1)/Tn, (Tn+2)/(Tn+1), (Tn+3)/(Tn+2), and so forth.

In the second embodiment, the interruption time judgment circuit 23 compares the ratio between two successive zero point intervals detected each half cycle of the detected current signal I to the aforementioned set value in determining whether the zero point interval has changed. It is therefore unnecessary to take into consideration power frequency variations or sensing errors of individual current sensing devices, and the set value may be a relatively small value. The aforementioned arrangement of the second embodiment produces an advantage that the change in successive zero point intervals can be detected in a reliable fashion.

In summary, a switchgear control apparatus of the present invention controls opening/closing operation of a circuit breaker of a switchgear for disconnecting and reconnecting a power transmission line under no-load conditions. The switchgear control apparatus includes a voltage sensor for detecting an AC voltage on a power source side of the circuit breaker, a current transformer for detecting a main circuit current flowing through the circuit breaker, a contact opening time sensor for detecting contact opening time of a main contact of the circuit breaker at interruption of the power transmission line, an interruption time sensor for detecting interruption time at which the main circuit current flowing through the circuit breaker has been interrupted based on an output of the current transformer and the contact opening time detected by the contact opening time sensor, and a reclosing time decider for determining reclosing time at which the main contact of the circuit breaker should be reclosed for reconnecting the power transmission line based on an output of the voltage sensor, the output of the current transformer and the interruption time detected by the interruption time sensor.

In one aspect of the invention, the contact opening time sensor detects the contact opening time of the main contact of the circuit breaker based on a make-break signal produced by an auxiliary contact which makes and breaks in a manner mechanically interlocked with the main contact of the circuit breaker. This arrangement makes it possible to detect the contact opening time in an easy and reliable fashion.

In another aspect of the invention, the interruption time sensor includes a zero point interval detecting circuit for successively detecting time intervals from one zero point to the next of the output of the current transformer, and an interruption time judgment circuit for judging that the interruption time, which comes not earlier than the contact opening time detected by the contact opening time sensor, is time of a zero point immediately preceding a zero point at which a difference between the time interval between two successive zero points detected by the zero point interval detecting circuit and half the period of a power frequency of the AC voltage on the power source side exceeds a specific value. This arrangement makes it possible to detect the interruption time of the main circuit current from the output of the current transformer in an easy and reliable fashion.

In still another aspect of the invention, the interruption time sensor includes a zero point interval variation sensing circuit for successively detecting time intervals from one zero point to the next of the output of the current transformer and calculating the amount of a change in the successively detected time intervals, and an interruption time judgment circuit for judging that the interruption time, which comes not earlier than the contact opening time detected by the contact opening time sensor, is time of a zero point immediately preceding a zero point at which the amount of the change in the successively detected time intervals detected by the zero point interval variation sensing circuit exceeds a specific value. This arrangement also makes it possible to detect the interruption time of the main circuit current from the output of the current transformer in an easier and more reliable fashion.

In yet another aspect of the invention, the reclosing time decider detects the gradient of the main circuit current flowing through the circuit breaker detected by the current transformer at the interruption time detected by the interruption time sensor, wherein the reclosing time decider sets the reclosing time at a point in phase where the AC voltage on the power source side detected by the voltage sensor has a maximum negative value if the gradient of the main circuit current is positive, whereas the reclosing time decider sets the reclosing time at a point in phase where the AC voltage on the power source side detected by the voltage sensor has a maximum positive value if the gradient of the main circuit current is negative. This arrangement makes it possible to suppress the occurrence of a surge voltage at reclose of the circuit breaker in a reliable fashion.

What is claimed is:

1. A switchgear control apparatus for controlling opening/closing operation of a circuit breaker of a switchgear which disconnects and reconnects a power transmission line under no-load conditions, said switchgear control apparatus comprising:

a voltage sensor for detecting an AC voltage on a power source side of said circuit breaker;

a current transformer for detecting a main circuit current flowing through said circuit breaker;

a contact opening time sensor for detecting contact opening time of a main contact of said circuit breaker at interruption of the power transmission line;

an interruption time sensor for detecting interruption time at which the main circuit current flowing through the circuit breaker has been interrupted based on an output of said current transformer and the contact opening time detected by said contact opening time sensor; and a reclosing time decider for determining reclosing time at which the main contact of said circuit breaker should be reclosed for reconnecting the power transmission line based on an output of said voltage sensor, the output of said current transformer and the interruption time detected by said interruption time sensor.

2. The switchgear control apparatus according to claim 1, wherein said contact opening time sensor detects the contact opening time of the main contact of said circuit breaker based on a make-break signal produced by an auxiliary contact which makes and breaks in a manner mechanically interlocked with the s main contact of said circuit breaker.

3. The switchgear control apparatus according to claim 1, wherein said interruption time sensor includes:

a zero point interval detecting circuit for successively detecting time intervals from one zero point to the next of the output of said current transformer; and an interruption time judgment circuit for judging that said interruption time, which comes not earlier than the contact opening time detected by said contact opening time sensor, is time of a zero point immediately preceding a zero point at which a difference between the time interval between two successive zero points detected by said zero point interval detecting circuit and half the period of a power frequency of the AC voltage on the power source side exceeds a specific value.

4. The switchgear control apparatus according to claim 1, wherein said interruption time sensor includes:

a zero point interval variation sensing circuit for successively detecting time intervals from one zero point to the next of the output of said current transformer and calculating the amount of a change in the successively detected time intervals; and an interruption time judgment circuit for judging that said interruption time, which comes not earlier than the contact opening time detected by said contact opening time sensor, is time of a zero point immediately preceding a zero point at which the amount of the change in the successively detected time intervals detected by said zero point interval variation sensing circuit exceeds a specific value.

5. The switchgear control apparatus according to claim 1, wherein said reclosing time decider detects the gradient of the main circuit current flowing through said circuit breaker detected by said current transformer at the interruption time detected by said interruption time sensor, and wherein said reclosing time decider sets the reclosing time at a point in phase where the AC voltage on the power source side detected by said voltage sensor has a maximum negative value if the gradient of the main circuit current is positive, whereas said reclosing time decider sets the reclosing time at a point in phase where the AC voltage on the power source side detected by said voltage sensor has a maximum positive value if the gradient of the main circuit current is negative.

* * * * *